Jan. 30, 1923.
C. H. COWAN, JR.
SWIFT.
FILED JUNE 4, 1921.
1,443,350
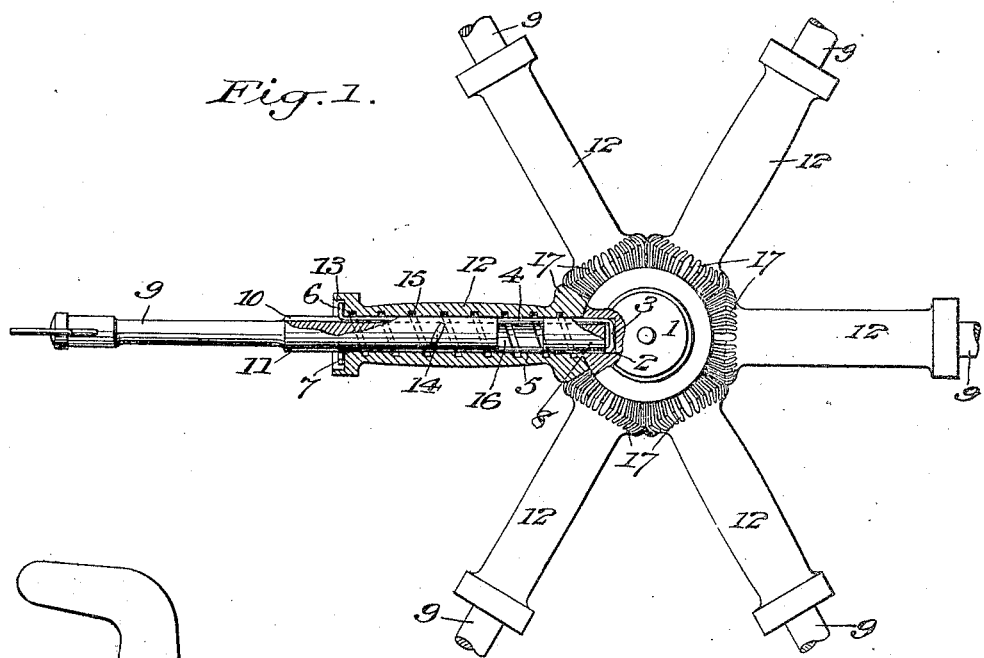
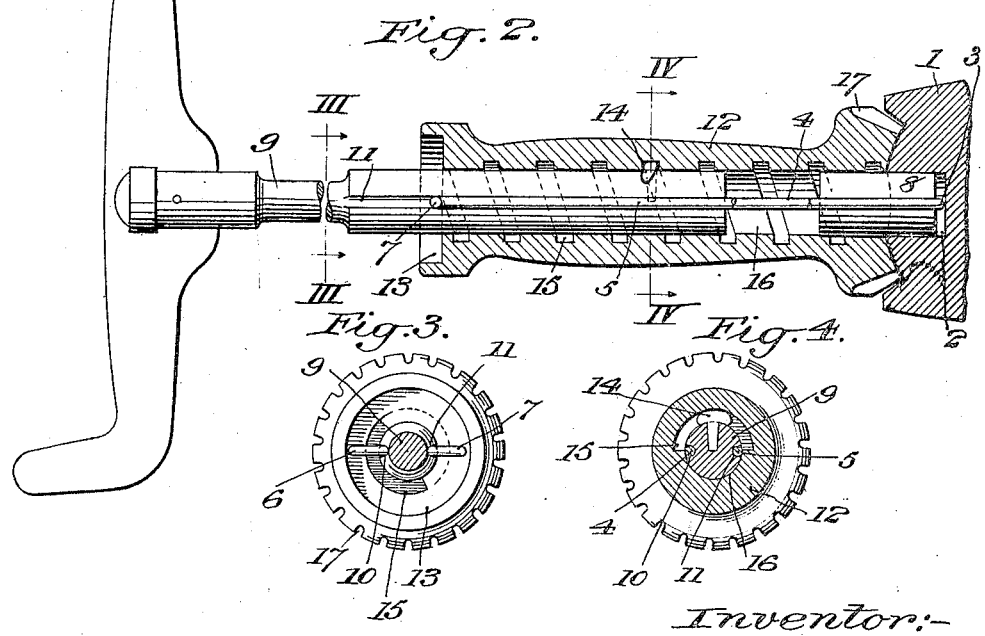
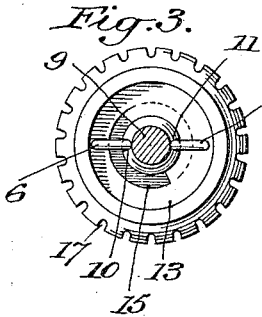
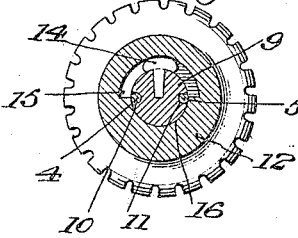
Inventor:-
Charles H. Cowan Jr.
by attorneys Patented Jan. 30, 1923.

1,443,350

UNITED STATES PATENT OFFICE.

CHARLES H. COWAN, JR., OF STONINGTON, CONNECTICUT, ASSIGNOR TO ATWOOD MACHINE COMPANY, OF STONINGTON, CONNECTICUT, A CORPORATION OF NEW JERSEY.

SWIFT.

Application filed June 4, 1921. Serial No. 474,956.

*To all whom it may concern:*

Be it known that I, CHARLES H. COWAN, Jr., a citizen of the United States, and resident of Stonington, in the county of New London and State of Connecticut, have invented a new and useful Improvement in Swifts, of which the following is a specification.

The object of my invention is to provide certain improvements in swifts or reels whereby the structure will be materially simplified and strengthened, and in which the rotatable sleeves which control the longitudinal movement of the arms of the swift or reel are directly intergeared.

A practical embodiment of my invention is represented in the accompanying drawings, in which, Fig. 1 represents a detail side view of the swift or reel, certain of the parts being shown in section.

Fig. 2 represents an enlarged detail sectional view taken at right angles to Fig. 1, showing a portion of the hub, one of the wire supports, one of the radial arms and one of the rotatable sleeves.

Fig. 3 represents a cross section taken in the plane of the line III—III of Fig. 2.

Fig. 4 represents a cross section taken in the plane of the line IV—IV of Fig. 2.

The hub of the swift is denoted by 1 and it has a plurality of radially disposed recesses 2 for the reception of the closed ends 3 of substantially U-shaped wire supports, the outer ends of the branches 4 and 5 of said U-shaped wire supports being turned laterally, as shown at 6 and 7. Blocks 8 which snugly fit the recesses 2 are provided for anchoring the wire supports in the said recesses.

Each radially disposed arm 9 is provided with a pair of oppositely arranged longitudinal grooves 10, 11, within which the branches 4, 5, of the wire support are located to prevent the arm from turning as it is moved longitudinally.

Each of the radially disposed rotatable sleeves 12 is held against longitudinal movement by the wire support. In the present instance the outer end of the sleeve 12 is provided with an annular recess 13 in which the laterally turned ends 6 and 7 of the branches 4 and 5 of the wire support are located.

Connecting means are provided between the rotatable sleeve 12 and the arm 9, whereby the rotary movement of the sleeve will impart a longitudinal movement to the arm. In the present instance this connecting means comprises a lug or projection 14 on the arm, which is arranged to travel in the groove 15 of the screw-threaded bore 16 of the rotatable sleeve 12.

Each of the sleeves 12 is provided with a gear 17 which directly meshes with the gears of the two adjacent sleeves, whereby the rotary movement of one of the sleeves will impart rotary movement to the remaining sleeves and longitudinal movement to all of the arms 9.

Therefore, when it is desired to change the length of the radial arms the operator grasps one sleeve 12 and rotates it, thus acting on all of the other sleeves 12 through the bevel gears 17.

It will be noted that the block 8 is substantially the same diameter as the bore 16 of the sleeve, to provide a bearing for the inner end of the sleeve. It will also be noted that the inner portion of the arm 9 is enlarged to substantially the same diameter as the bore 16 of the sleeve so as to provide an extended bearing contact between the arm and sleeve.

It is evident that various changes may be made in the construction, form and arrangement of the several parts without departing from the spirit and scope of my invention; hence I do not wish to limit myself to the particular embodiment herein shown and described, but

What I claim is:—

1. In a swift, a hub provided with radially disposed wire supports, radially disposed arms slidably engaged with said supports, radially disposed rotatable sleeves held against longitudinal movement on said supports, and connecting means between said arms and sleeves whereby the rotary movement of the sleeves will impart longitudinal movement to said arms.

2. In a swift, a hub provided with radially disposed wire supports, radially disposed arms slidably engaged with said supports and radially disposed rotatable sleeves held against longitudinal movement on said supports, said arms having projections and said sleeves having screw-threaded bores engaging said projections whereby the rotary movement of the sleeves will impart longitudinal movement to said arms.

3. In a swift, a hub provided with pairs of radially disposed wire branches, radially disposed arms having pairs of oppositely arranged longitudinal grooves within which the branches are located to prevent the arms from turning, radially disposed rotatable sleeves held against longitudinal movement by said pairs of branches, and connecting means between said arms and sleeves whereby the rotary movement of the sleeves will impart longitudinal movement to said arms.

4. In a swift, a hub provided with pairs of radially disposed wire branches, radially disposed arms having pairs of oppositely arranged longitudinal grooves within which the branches are located to prevent the arms from turning, and radially disposed rotatable sleeves held against longitudinal movement by said pairs of branches, said arms having projections and said sleeves having screw-threaded bores engaging said projections whereby the rotary movement of the sleeves will impart longitudinal movement to said arms.

5. In a swift, a hub having radially disposed recesses, a plurality of substantially U-shaped wire supports having their closed ends anchored in said recesses and having the outer ends of their branches laterally turned, radially disposed arms having pairs of oppositely arranged longitudinal grooves within which the branches are located to prevent the arms from turning, radially disposed rotatable sleeves held against longitudinal movement by said laterally turned ends of the branches of the wire supports, and connecting means between said arms and sleeves whereby the rotary movement of the sleeves will impart longitudinal movement to said arms.

6. In a swift, a hub having radially disposed recesses, a plurality of substantially U-shaped wire supports having their closed ends anchored in said recesses and having the outer ends of their branches laterally turned, radially disposed arms having pairs of oppositely arranged longitudinal grooves within which the branches are located to prevent the arms from turning, and radially disposed rotatable sleeves held against longitudinal movement by said laterally turned ends of the branches of the wire supports, said arms having projections and said sleeves having screw-threaded bores engaging said projections whereby the rotary movement of the sleeves will impart longitudinal movement to said arms.

7. In a swift, a hub, radially disposed supports, radially disposed arms slidably engaged with said supports, radially disposed rotatable sleeves held against longitudinal movement by said supports, connecting means between said arms and sleeves whereby the rotary movement of the sleeves will impart longitudinal movement to said arms, each of said sleeves being provided with a gear directly meshing with the gears of two adjacent sleeves whereby the rotary movement of one sleeve will impart rotary movement to all of the other sleeves.

8. In a swift, a hub, radially disposed supports, radially disposed arms slidably engaged with said supports, and radially disposed rotatable sleeves held against longitudinal movement by said supports, said arms having projections and said sleeves having screw-threaded bores engaging said projections whereby the rotary movement of the sleeves will impart longitudinal movement to said arms, each of said sleeves being provided with a gear directly meshing with the gears of two adjacent sleeves, whereby the rotary movement of one sleeve will impart rotary movement to all of the other sleeves.

In testimony, that I claim the foregoing as my invention, I have signed my name this 26th day of May, 1921.

CHARLES H. COWAN, Jr.